Aug. 5, 1969   C. A. MUENCH ET AL   3,459,455
WHEEL ADAPTOR ASSEMBLY
Filed June 14, 1967

*Inventors*
CHARLES A. MUENCH
ALLEN D. PENNIMAN, JR.

By Cohn and Powell
*Attorney*

United States Patent Office 3,459,455
Patented Aug. 5, 1969

3,459,455
WHEEL ADAPTOR ASSEMBLY
Charles A. Muench, Chesterfield, and Allen D. Penniman, Jr., Crestwood, Mo., assignors to Forecast, Inc., St. Louis, Mo., a corporation of Missouri
Filed June 14, 1967, Ser. No. 645,907
Int. Cl. B60b 1/00, 27/00, 1/06
U.S. Cl. 301—9                                    6 Claims

ABSTRACT OF THE DISCLOSURE

An annular adaptor plate placed between an automobile wheel hub and the wheel drum to enable one type of wheel hub to be fitted to wheel drums of different stud circle diameters. The adaptor plate has several concentric hole circles, each corresponding to the stud circle of a particular class of automobile. The wheel hub is provided witth a concentric circle of identical oversized holes spaced at equal intervals and corresponding in number to the wheel drum studs. Plugs are provided on the adaptor plate, radially adjacent to the adaptor plate holes and are so shaped as to occupy a portion of the associated oversize holes in the wheel hub. In this way the studs may be aligned with a like-sized hole in the wheel hub, and the hub can be mounted to the drum with only a normal amount of play between the fastener and the hole. Pockets on the wheel hub accommodate plugs not being utilized.

BACKGROUND OF THE INVENTION

This invention relates generally to a wheel adaptor assembly, and more particularly to a ring adaptor useful for connecting automobile wheels to a variety of wheel hubs.

Throughout the automobile industry, there are several variations existing with respect to stud circle diameter and stud spacing. This variation presents a problem to wheel manufacturers, and particularly to manufacturers engaged in providing custom-made wheels for automobile enthusiasts. Without some form of adaptor, it would be necessary to provide each wheel with mounting holes specially located to coincide with the wheel mounting studs of each customer's individual automobile.

Obviously, it is desirable to have a minimum of play between the mounting hole and the fastener, thus ordinary slotted holes in the wheel hub are not in themselves adequate to make a satisfactory connection. On the other hand, to provide several different wheel hubs, each having a particular arrangement of holes, is an unsatisfactory solution because of the expense involved and the need for a much larger inventory of wheels.

Several attempts have been made to overcome this problem of wheel drum variation particularly with regard to the mounting stud arrangement, but none have proved completely satisfactory.

SUMMARY OF THE INVENTION

The wheel adaptor assembly includes a wheel hub, and an adaptor element spaced between the wheel hub and the wheel drum, the adaptor element having a plate portion.

The wheel hub includes a plurality of oversized holes corresponding in number to the number of wheel drum mounting studs, and includes a plurality of pocket portions spaced between the oversized holes.

The plate portion of the adaptor element is provided with a plurality of holes disposed so as to provide sets of holes which correspond in alignment to the wheel drum mounting studs of particular automobiles.

A plurality of outwardly projecting plugs, located on the face of the plate portion radially adjacent to the holes, selectively interfit the oversized holes provided in the wheel hub.

The selected plugs interfitting the oversized holes in the wheel hub, partially occupy the holes to provide remaining hole portions. The remaining hole portions are substantially centered with one set of mounting studs and with the adaptor plate holes associated with the interfitted plugs.

Rotation of the adaptor plate relative to the wheel hub, so that the adjacent set of plugs occupies the oversized holes, provides the wheel hub with a different set of mounting holes on a different hole circle corresponding to a different set of mounting studs on a different stud circle.

The studs thus aligned by rotation are utilized to attach the wheel hub to the wheel drum. The holes in the adaptor element are disposed in a plurality of concentric circles, each circle of holes corresponding to a different set of mounting studs.

The plate portion of the adaptor element has the configuration of an annular ring.

The wheel hub is fastened to the wheel drum by means of a nut having a hollow shank, threadedly receiving the stud, and a shoulder portion cooperating with the wheel hub to connect the wheel to the drum.

The features referred to in this summary, together with numerous other advantages of the invention, will more clearly appear from the following detailed description of a preferred embodiment, particularly when considered in connection with the accompanying drawings.

DESCRIPTION OF THE PREFERRED EMBODIMENT

Figure 2:
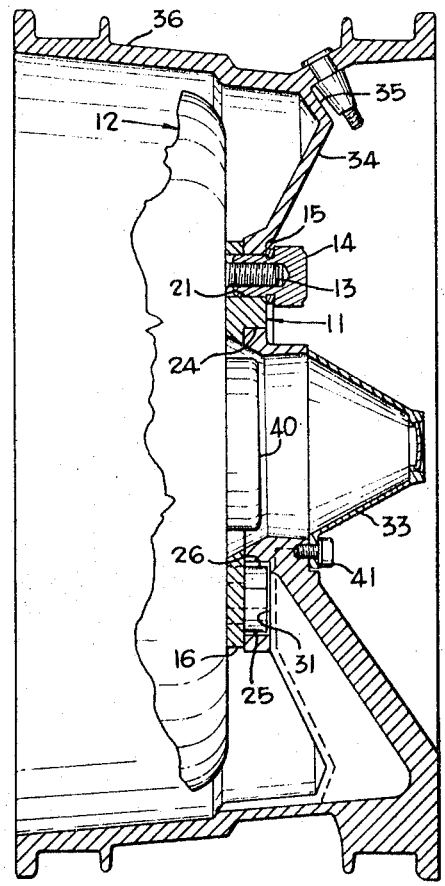
FIG. 2 is an enlarged sectional elevation on line 2—2 of FIG. 1, illustrating the wheel assembly.
Figure 1:
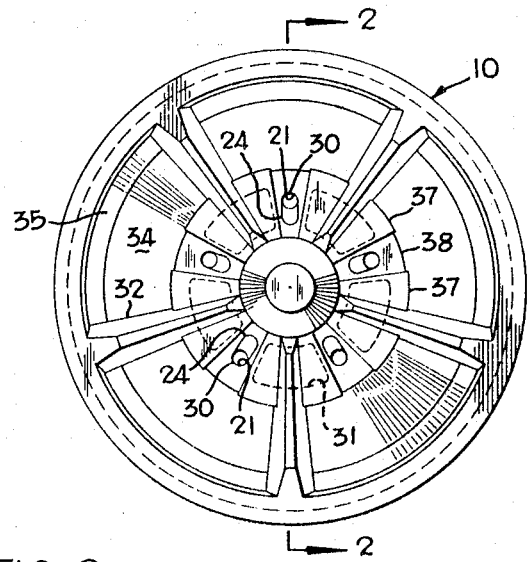
FIG. 1 is a front elevation of the wheel hub, the studs and fastening nuts are not shown for clarity.

Referring now by characters of reference to the drawing, and first to FIG. 1, it will be understood that the wheel assembly includes a unitary wheel hub 10 as shown in FIG. 2. An adaptor element 11 is used in conjunction with the wheel hub 10 to provide a means of mounting the wheel hub 10 to any one of a number of wheel drums, of which that indicated by numeral 12 is a representative example. The wheel drum 12 is provided with a plurality of mounting studs 13 arranged in a concentric circle about the axis of rotation of the wheel drum 12. Hollow nuts 14 constituting a fastening means, which are threaded internally, are used in conjunction with the mounting studs 13 to mount the wheel hub 10 to the wheel drum 12. A washer 15 provides a bearing surface for the head of the nut 14.

The invention will be described with reference to a wheel assembly provided with five mounting studs 13 on each wheel drum 12. It will become clear that both the wheel 10 and the wheel adaptor 11 can be modified to suit any number of wheel mounting studs.

Figure 3:
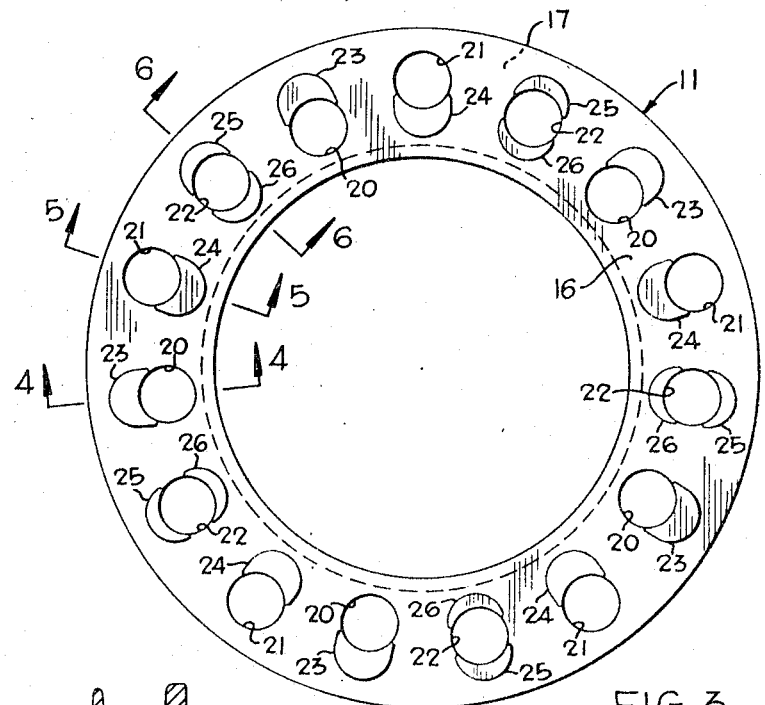
FIG. 3 is an enlarged view of the adaptor plate.

The adaptor element 11 is shown in FIG. 3, and in the preferred embodiment has an annular plate portion 16. The preferred embodiment is designed to accommodate three different sets of mounting studs 13, each set comprising five studs on different stud circles. A set of holes is provided for each set of mounting studs 13. Each set of holes 20, 21 and 22 is disposed on a concentric circle, the holes being disposed at equal angular intervals around their associated circle, and adjacent holes on adjacent circles are spaced at equal angular intervals from each other. The result is to provide an adaptor element 11 having fifteen holes in its plate portion 16, the holes 20, 21 and 22 being spaced at equal angular intervals around the plate portion 16.

Referring now to FIG. 1, the wheel hub 10 is provided with five radially elongated holes 30 disposed at equal intervals around a circle concentric with the center of the wheel hub 10. The elongate holes 30 have a slot-shaped configuration with semi-circular ends. The semi-circular ends are aligned with the circles of the innermost and outermost sets of holes 20 and 21.

Figure 4:
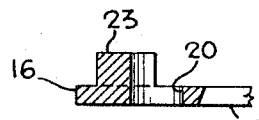
FIGS. 4, 5, and 6 are fragmentary sectional views taken on lines 4—4, 5—5 and 6—6 respectively of FIG. 3 which illustrate the disposition of the plugs.
Figure 5:
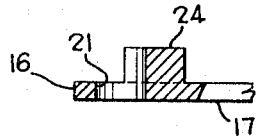
Figure 6:
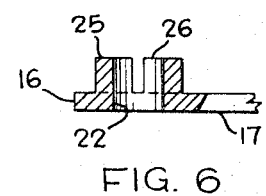

Outwardly projecting plugs 23, 24 and 25–26 are provided radially adjacent to the holes 20, 21 and 22 respectively in the plate portion 16. These plugs are illustrated in FIGS. 4, 5 and 6. The plugs 23, 24 and 25–26 are substantially crescent in configuration and provide means interfitting the elongate holes 30 provided in the wheel hub 10. Each plug is so shaped as to occupy partially each elongate hole 30 such that the remaining hole portion is substantially centered with the longitudinal axis of the studs when the wheel is mounted. The wheel hub 10 is so molded as to provide a plurality of pockets 31 to accommodate those plugs which are not interfitted in the holes 30 for the particular wheel. For example, in FIG. 1, the outermost circle of holes 21 is aligned with the slotted holes 30. The radially adjacent plugs 24 occupy the remaining portion of the elongate holes 30, and plugs 23 (not shown) and plugs 25–26 (now shown) are accommodated within the pockets 31.

Within the limitations imposed by the disposition of the elongate holes 30 and the pockets 31, the wheel manufacturer is free to design his wheel to produce a pleasing appearance. In the present wheel 10, the basic wheel design is highlighted by ribbed portion 32 and a boss portion 33. Conical panel portions 34 and 35 provide not only a pleasing appearance, but are structurally integrated with the ribs 32 and the wheel rim 36.

It is thought that the functional advantages of this wheel assembly have become fully apparent from the foregoing description of parts, but for completeness of disclosure, the installation of the wheel assembly will be briefly described.

The adaptor element 11 is oriented with respect to the front face of the wheel drum 12 until the mounting studs 13 of the wheel drum 12 are in substantial alignment with one of the sets of holes 20, 21, or 22. The projecting plugs 23, 24 and 25–26 of the adaptor element 11 face outward, and the adaptor element 11 is placed in position by bringing inner face 17 into contact with the outer face of the wheel drum 12.

The unitary wheel hub 10 may now be also placed in position. Selected plugs, are interfitted within wheel hub holes 30 to provide an adaptor plate circle of holes coinciding with the stud circle. Those plugs not utilized will be accommodated within the pockets 31 provided on the inner portion of the wheel hub 10 which comprises raised and recessed segments 37 and 38. No special alignment procedure is required. The slotted holes 30 are merely aligned with that set of holes in the adaptor element 11 which have received the mounting studs 13.

The annular configuration of the plate portion 16 of the adaptor elemnet 11 is preferred because this allows the stub end of the axle 40 to be accommodated within the aperture thereby formed.

The five hollow threaded nuts 14, complete with their bearing washers 15 forming a collar under the head, may now be threadedly attached to the mounting studs 13 in much the same way as the nuts of regular mounting studs are fastened in place. The plug, partially occupying the slotted hole 30 provides a bearing pad for the fastening means and provides even distribution of pressure that precludes distortion of the connected parts.

It will be understood that rotating the adaptor plate a single angular space, either clockwise or counterclockwise, provides alignment for another set of mounting studs on a different stud circle. The same wheel of course would be used in such case, one difference being that the alignment of such other set of mounting studs 13 would be disposed at a different location within the elongate oversized holes 30.

In order to complete the assembly of the wheel, it merely remains to connect the conically-shaped boss 33 in position at the center of the wheel, it being held there by means of tap bolts 41.

We claim as our invention:

1. A wheel assembly comprising:
 (a) a wheel drum having projecting studs in a circle diameter,
 (b) a wheel hub including a plurality of holes disposed in spaced relation around the hub,
 (c) an adaptor element including:
  (1) a plate portion having a plurality of holes selectively receiving the studs,
  (2) a plurality of plugs adjacent the holes in the plate portion and outwardly projecting from the plate portion, the plugs interfitting and restricting the size of the holes in the wheel hub to align the wheel hub with the studs,
 (d) means connecting the wheel hub to the projecting studs,
 (e) the holes in the adaptor element being disposed in a plurality of circle diameters, and
 (f) at least one circle diameter of holes in the adaptor element being substantially coincident with the stud circle diameters, the studs being aligned with the holes in the adaptor element disposed around said one circle diameter.

2. A wheel assembly, comprising:
 (a) a wheel drum having projecting studs in a circle diameter,
 (b) a wheel hub including a plurality of holes disposed in spaced relation around the hub,
 (c) an adaptor element including:
  (1) a plate portion having a plurality of holes selectively receiving the studs,
  (2) a plurality of plugs adjacent the holes in the plate portion and outwardly projecting from the plate portion, the plugs interfitting and restricting the size of the holes in the wheel hub to align the wheel hub with the studs,
 (d) means connecting the wheel hub to the projecting studs,
 (e) the holes in the wheel hub being radially elongate and disposed at equal intervals around a circle diameter substantially concentric with the axis of rotation of the wheel to align with studs disposed on different stud circle diameters,
 (f) the holes in the adaptor element being disposed in a plurality of circle diameters, and
 (g) at least one circle diameter of holes in the adaptor element being substantially coincident with the stud circle diameter, the studs being aligned with the holes in the adaptor element disposed around the said one circle diameter.

3. A wheel assembly as defined in claim 2, in which:
 (h) the total number of stud holes in the adaptor element is a multiple of the number of mounting studs projecting from the wheel drum.

4. A wheel assembly as defined in claim 2, in which:
 (e) the plate portion of the adaptor element is located between the wheel drum and the wheel hub, and
 (f) the wheel hub includes pockets accommodating those plugs other than those interfitting the holes in the wheel hub.

5. A wheel assembly as defined in claim 2, in which:
 (h) the plugs are disposed radially adjacent to the holes in the plate portion, whereby the holes in the plate portion, radially adjacent to those plugs interfitting the holes in the wheel hub, are substantially aligned with the remaining hole portions.

6. A wheel assembly comprising:
 (a) a wheel drum having projecting studs in a circle diameter,
 (b) a wheel hub including a plurality of holes disposed in spaced relation around the hub,
 (c) an adaptor element including:
  (1) a plate portion having a plurality of holes selectively receiving the studs,
  (2) a plurality of plugs adjacent the holes in the plate portion and outwardly projecting from the plate portion, the plugs interfitting and restricting the size of the holes in the wheel hub to align the wheel hub with the studs,
 (d) means connecting the wheel hub to the projecting studs,
 (e) the holes in the wheel hub being radially elongate and disposed at equal intervals around a circle diameter substantially concentric with the axis of rotation of the wheel to receive the studs disposed on different stud circle diameters,
 (f) the holes in the adaptor element being disposed in a plurality of concentric circles of different diameters,
 (g) at least one of the circle diameter of holes being substantially coincident with the stud circle diameter, the studs being received into the holes of said one circle diameter,
 (h) the total number of stud holes in the adaptor element being a multiple of the number of mounting studs,
 (i) the plate portion of the adaptor element having an annular configuration adapted to provide clearance for a wheel axle,
 (j) the wheel hub including pockets accommodating plugs other than those interfitting the holes in the wheel hub,
 (k) the plugs, selectively interfitting the radially elongate holes in the wheel hub, partially occupying said holes so that the remaining hole portions are substantially centered with the studs, and
 (l) the plugs being disposed radially adjacent to the holes in the plate portion whereby the holes radially adjacent to those plugs interfitting the elongate holes in the wheel hub are substantially aligned with the said remaining hole portions.

References Cited

UNITED STATES PATENTS

| | | | |
|---|---|---|---|
| 1,934,971 | 11/1933 | Eksergian | 301—36 |
| 2,288,474 | 6/1942 | Manning | 301—36 |
| 2,336,767 | 12/1943 | Ash | 301—9 |
| 2,570,559 | 10/1951 | Juergenson | 301—9 |
| 2,590,363 | 3/1952 | Adair | 301—9 |
| 3,166,357 | 1/1965 | Vachon | 301—9 |
| 3,329,468 | 7/1967 | Beith | 301—65 X |
| 3,361,482 | 1/1968 | Stevens | 301—9 |

FOREIGN PATENTS 859,193  1/1961  Great Britain.

RICHARD J. JOHNSON, Primary Examiner

U.S. Cl. X.R.

301—64